United States Patent
Pöschmann et al.

(10) Patent No.: US 11,435,712 B2
(45) Date of Patent: Sep. 6, 2022

(54) STORAGE OF DEVICE-RELATED DATA RELATING TO FIELD DEVICES IN A CLOUD

(71) Applicant: Endress+Hauser Process Solutions AG, Reinach (CH)

(72) Inventors: Axel Pöschmann, Basel (CH); Michael Mayer, Oberwil (CH); Michael Maneval, Schopfheim (DE)

(73) Assignee: ENDRESS+HAUSER PROCESS SOLUTIONS AG, Reinach (CH)

( * ) Notice: Subject to any disclaimer, the term of this patent is extended or adjusted under 35 U.S.C. 154(b) by 49 days.

(21) Appl. No.: 16/982,991

(22) PCT Filed: Feb. 18, 2019

(86) PCT No.: PCT/EP2019/053931
§ 371 (c)(1),
(2) Date: Sep. 21, 2020

(87) PCT Pub. No.: WO2019/179704
PCT Pub. Date: Sep. 26, 2019

(65) Prior Publication Data
US 2021/0003984 A1    Jan. 7, 2021

(30) Foreign Application Priority Data
Mar. 20, 2018    (DE) ...................... 10 2018 106 514.0

(51) Int. Cl.
*G05B 19/042* (2006.01)
*G05B 19/418* (2006.01)
*H04L 67/1001* (2022.01)

(52) U.S. Cl.
CPC ..... *G05B 19/0425* (2013.01); *G05B 19/4185* (2013.01); *H04L 67/1001* (2022.05);
(Continued)

(58) Field of Classification Search
CPC ............ G05B 19/0423; G05B 19/0425; G05B 19/4185; G05B 2219/25101;
(Continued)

(56) References Cited

U.S. PATENT DOCUMENTS

| | | | |
|---|---|---|---|
| 2013/0212214 A1* | 8/2013 | Lawson | H04L 43/045 709/217 |
| 2016/0150014 A1* | 5/2016 | Yliaho | G06F 16/16 709/216 |
| 2016/0246294 A1* | 8/2016 | Girardey | G05B 19/41845 |

FOREIGN PATENT DOCUMENTS

| | | |
|---|---|---|
| DE | 102014106632 A1 | 11/2015 |
| DE | 102015113979 A1 | 3/2017 |

(Continued)

OTHER PUBLICATIONS

Larry Burgess, How Does Sensor Data Go From Device To Cloud?, Oct. 13, 2015, Guest author Larry Burgess is the wireless technical editor at Voler Systems., p. 1-3. (Year: 2015).*

(Continued)

*Primary Examiner* — Kidest Bahta
(74) *Attorney, Agent, or Firm* — Kelly J. Smith; Endress+Hauser (USA) Holding Inc.

(57) ABSTRACT

A method for storing data for at least one of a device state, device diagnosis and calibration of a field device in a cloud, with the field device having a self-monitoring functionality. The method includes device-internal registering of first data for at least one of a device state, device diagnosis and calibration by the field device and transfer of the device-internally registered first data from the field device to the cloud. Moreover, the method includes registering second data for at least one of a device state, device diagnosis and calibration of the field device using an external service computer and transferring the second data from the external (Continued)

service computer to the cloud. Both the first data as well as also the second data are stored in the cloud.

17 Claims, 3 Drawing Sheets

(52) U.S. Cl.
CPC .............. *G05B 2219/25101* (2013.01); *G05B 2219/25428* (2013.01); *G05B 2219/33331* (2013.01)

(58) Field of Classification Search
CPC ........... G05B 2219/25428; G05B 2219/33331; H04L 67/1002
See application file for complete search history.

(56) References Cited

FOREIGN PATENT DOCUMENTS

| | | |
|---|---|---|
| DE | 102015120731 A1 | 6/2017 |
| DE | 102016107104 A1 | 10/2017 |
| DE | 102016207058 A1 | 10/2017 |

OTHER PUBLICATIONS

Dang et al., Building a gateway from the sensors to the cloud, Nov. 2017, Texas Instruments, p. 1-8. (Year: 2017).*

* cited by examiner

STORAGE OF DEVICE-RELATED DATA RELATING TO FIELD DEVICES IN A CLOUD

CROSS-REFERENCE TO RELATED APPLICATIONS

The present application is related to and claims the priority benefit of German Patent Application No. 10 2018 106 514.0, filed on Mar. 20, 2018 and International Patent Application No. PCT/EP2019/053931 filed on Feb. 18, 2019, the entire contents of which are incorporated herein by reference.

TECHNICAL FIELD

The invention relates to a method for storing data of at least one of device state, device diagnosis and calibration of a field device in a cloud. Moreover, the invention relates to a fieldbus system, which includes a field device and a cloud.

BACKGROUND

In automation technology, field devices are often applied, which serve for registering and/or influencing process variables. Examples of such field devices include fill level measuring devices, mass flow measuring devices, pressure- and temperature measuring devices, etc., which as sensors register the corresponding process variables, fill level, flow, pressure, or temperature, as the case may be.

In addition to the actual measured values, modern field devices register during operation data concerning device state, device diagnosis and calibration of the field device, in order, in this way, to monitor and to document that the field device is working properly and the delivered, measured values are correct. Many devices are equipped for this purpose with a self-monitoring functionality, which can include, for example, subfunctionalities for registering device state, for device diagnosis and for performing self-tests. In this way, deviations from normal functioning as well as defective measured values can be recognized early.

SUMMARY

An object of the invention is to provide a method, which enables an improved representation and evaluation of data of a field device for at least one of device state, device diagnosis and calibration.

The object is achieved by features as set forth in claims 1 and 17.

Advantageous further developments of the invention are provided in the dependent claims.

A method according to the forms of embodiment of the invention serves for storing data for at least one of device state, device diagnosis and calibration of a field device in a cloud. In such case, the field device has a self-monitoring functionality. The method includes device-internal registering of first data for at least one of device state, device diagnosis and calibration by the field device and transferring the device-internally registered, first data from the field device to the cloud. Moreover, the method includes registering of second data for at least one of device state, device diagnosis and calibration of the field device by means of an external service computer and transfer of the second data from the external service computer to the cloud. Both the first data as well as also the second data are stored in the cloud. The steps of the method can be performed in any sequence. The steps can be performed sequentially, simultaneously or overlapping one another.

Many field devices are equipped with a self-monitoring functionality, which monitors the functioning of the field device during ongoing operation and so assures the correctness of the delivered, measured values. For the field devices of Endress+Hauser, such a self-monitoring functionality is offered, for example, under the mark, "Heartbeat". In such case, the self-monitoring functionality can comprise, for example, the device-internal read-out and monitoring of a set of device parameters. The self-monitoring functionality can comprise, for example, the registering and tracking of the device state of the field device. The self-monitoring functionality can, moreover, comprise, for example, the performing of a self-test, wherein, in the context of the self-test, a function checking of components of the field device is performed. By self-monitoring functionality in its different variants, device-internally, first data for at least one of device state, device diagnosis and calibration can be registered, transferred from the field device into the cloud and stored there.

Moreover, field devices are, as a rule, and from time to time, subjected to maintenance and re-calibrated. The data occurring in the case of performing such maintenance- or calibration are registered by means of an external service computer. The terminology, "external service computer", means, in such case, a computer, which is not connected permanently with the field device and the fieldbus network of the field device, but, rather, at most, connected temporarily with the field device during a service visit. The external service computer is, thus, not part of the fieldbus network.

The second data registered by the external service computer for at least one of device state, device diagnosis and calibration are according to the present invention likewise transferred into the cloud and stored. In such case, the transfer of the second data into the cloud can occur either directly or indirectly. In the case of direct transfer, the data registered by the external service computer are transferred from the external service computer via a data connection directly into the cloud and stored there, wherein the data connection can be, for example, a wireless connection. The second data can, however, also be transferred indirectly into the cloud. For example, the external service computer can transfer the data, firstly, to a central data processing system, in which, for example, the data of service instances are stored. From there, the data can then be transferred via another data connection to the cloud and stored there.

In this way, it is possible to bring the device-internally registered, first data and the second data registered by the external service computer together in the cloud. In this way, especially representation and evaluation of the first and the second data together is enabled. By the combined presentation of these data, a novel total overview of the device state is possible. For example, the first and the second data for at least one of device state, device diagnosis and calibration can be shown graphically as a function of time. Moreover, it is possible, for example, to present the device-internally registered, first data for calibration, which are ascertained, for example, in the case of a self-test, together with the second data for calibration registered by the service computer. The results of device internal self-test can, for example, be compared with results of an external calibration performed, for example, by means of a calibrator. Since the calibration data agree in the case of devices functioning without problem, such comparisons support the acceptance and plausibility of device-internally performed self-tests. By storing the first and second data in the cloud, a chronological documentation is created. When it should be checked, whether a field device functioned correctly, for example, during the production of a certain batch, the data stored in the cloud can be checked.

In a preferred example of an embodiment, the first data of the field device and the second data of the field device are stored in the cloud in a record associated with the field device. In a preferred solution of this, the data transferred to the cloud are stored in records, each of which is associated with a particular field device, wherein a record in the cloud for a field device is identifiable based on an identifier characteristic for the field device. In a preferred solution, the data transferred to the cloud are stored in records, each of which is associated with a particular field device, wherein a record in the cloud for a field device is identifiable based on an identifier characteristic for the field device, wherein the characteristic identifier is one of the following: manufacturer and serial number of the field device, a UUID (Universal Unique Identifier) of the field device, a MAC address of a network card of the field device, a unique identifier of a SIM card of the field device. Both first data transferred into the cloud as well as also second data transferred into the cloud are preferably associated with records for corresponding field devices in the cloud according to field device identifiers, which first and second data are transferred always accompanied by the relevant identifier. In this way, the first data for a field device and the second data for a field device can be brought together in the cloud.

In a preferred example of an embodiment, the method includes retrieving at least a part of the first data and at least a part of the second data of one or more field devices from the cloud by an evaluation unit, which is embodied to evaluate and/or to present the downloaded data. In such case, the evaluation unit can be embodied, for example, as an evaluation unit executable in the cloud. Alternatively, the evaluation unit can be embodied, for example, as an evaluation unit executable in a third computer to retrieve data from the cloud, to evaluate the downloaded data and/or to present such on a display. By means of the evaluation unit, the user can obtain an overview concerning the state of the field devices of a fieldbus system.

In a preferred example of an embodiment, stored in the cloud are first and second data from a plurality of field devices, which are located at different places and/or in different fieldbus networks. In a preferred solution, the evaluation unit is embodied to retrieve from the cloud, to evaluate and/or to present on a display at least a part of the first data and at least a part of the second data of a plurality of field devices, which are located at different places and/or in different fieldbus networks. The location wide evaluation of the first and second data enables, for example, filtering data stored in the cloud according to a predeterminable filter criterion and, in this way, for example, to select data of a certain type of field device, a certain measuring principle or a field device operated in a certain installation environment. In this way, it is possible, for example, to detect a systematic measured value drift in the case of certain types of field devices or in certain use environments. Moreover, for example, by means of an averaging method or other statistical methods, or evaluations, a typical device behavior for a certain device type or a certain use environment can be ascertained, wherein the averaged data can be used, for example, as performance reference for the device type or use environment.

A fieldbus system in accordance with forms of embodiment of the invention includes a field device, which has a self-monitoring functionality and is embodied to register device-internally first data for at least one of device state, device diagnosis and calibration of the field device, as well as a cloud, wherein the device-internally registered, first data are transferable from the field device to the cloud. Second data for at least one of device state, device diagnosis and calibration of the field device are registrable by means of an external service computer and transferable to the cloud. The data stored in the cloud comprise both the device-internally registered, first data as well as also second data registered by the external service computer.

BRIEF DESCRIPTION OF THE DRAWINGS

The invention will now be explained in greater detail based on examples of embodiments illustrated in the drawing. The figures of the drawing show as follows.

DETAILED DESCRIPTION

Field devices used in process automation technology are equipped in increasing measure with functions for self monitoring, self-diagnosis and self-test. Such a self-monitoring functionality provided in the field device permits monitoring state of the field device during operation. The self-monitoring functionality enables an early detecting of malfunctions of individual components of the field device as well as of defective measured values and thus contributes to the reliable operation of the field device.

Provided by the firm, Endress+Hauser, under the category, "Heartbeat Technology", are various functionalities for self monitoring of field devices. These functionalities can include, for example, functionalities for diagnosis of the field device, for verification of the field device and for monitoring device parameters of the field device. These functionalities for self monitoring are offered by the firm, Endress+Hauser, under the designations, "Heartbeat Diagnosis", "Heartbeat Verification" and "Heartbeat Monitoring". In the following, these mutually supplementing functions for self monitoring of a field device will be described in greater detail.

In the case of verification, the device conducts a self-test of its components, in order so to verify the correct functioning of the field device. The device self test can be performed without needing to deinstall the field device from where it is being used. Preferably, the device self test is performed upon an explicit command of the user. Alternatively, it is, however, also possible to perform the self-test automatically, for example, in specified time intervals.

Figure 1:
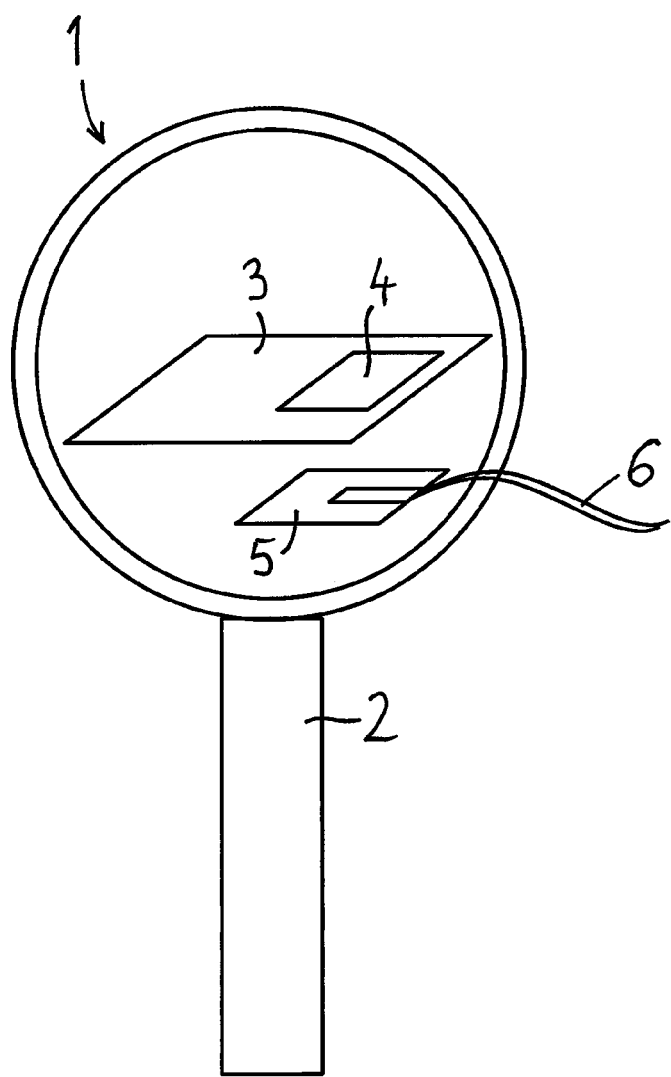
FIG. 1 shows a field device equipped with a self-monitoring functionality.

FIG. 1 shows an example of a fill-level measuring device 1, which is equipped with a function for the device self test. The fill-level measuring device 1 includes a sensor 2 for registering fill level, a main electronics module 3 for evaluation of the sensor signal, at least one memory 4 for storing programs and measured values, as well as an IO module 5, which outputs the output signal via the connection cable 6 of the field device. For performing the self-test, the fill-level measuring device 1 is provided with an additional test electronics, which is embodied to check the functioning of the individual components of the fill-level measuring device 1. The test electronics can check at least some of the components of the field device, thus, for example, the sensor 2, the main electronics module 3, the at least one memory 4, the IO module 5 as well as the connection cable 6, to determine whether they are functioning in a proper manner. The self-test of the fill-level measuring device 1 delivers one of two possible results, "passed" or "failed". Contained in the test result can be, for example, also separate, individual results for the different components of the fill-level measuring device 1. The field device has passed the test, when all checked components are functioning correctly. The result of the self-test is preferably documented in the form of a test certificate. Such test certificates are recognized, for example, by TÜV (Technical Inspection Association) in given circumstances as proof of the proper functioning of the field device. Especially, such test certificates can serve at least for a certain time span in place of a re-calibration of the device. While the self-test can be performed in the installed state of the field device, a removal of the device from its measuring environment can be required for a re-calibration.

Moreover, the field device can be equipped with a function for diagnosis, which enables a continuous self monitoring of the field device. The diagnostic function registers the device state of the field device and produces in specified time intervals standardized device diagnosis reports, wherein these reports can supplementally include, for example, instructions for defect removal. A current device diagnosis is displayed to the user via suitable status- and error reports. Preferably, the current device diagnosis is one of a number of standardized device states. For classification of the current device state, the so-called NAMUR device states can be used, for example, as defined in the standard, NAMUR NE 107. According to this standard, the registered device state is associated with one of five possible states, wherein for the presentation of the five states a standardized color code and symbol system is used. A green symbol shows that a valid process signal is present during regular operation. A blue symbol signals a valid process signal, wherein, however, need for maintenance is present. A yellow symbol means that the signal lies outside of specification. An orange symbol stands for a temporarily invalid signal during function testing and a red symbol shows an invalid signal in the case of defect. Through the use of standardized colored symbols for the different device states, the user obtains quick information concerning the current device state of a field device.

Additionally, a function for monitoring the field device can be provided, in order to monitor selected device parameters of the field device. From the parameters of the field device, a specific set of device parameters is selected and monitored. Preferably, the selected parameters or at least some of the selected parameter characterize at least one of device state, device diagnosis and calibration of the field device. The selected parameters are read-out from the field device and evaluated according to a specific time schedule, preferably at regular intervals. For example, the read-out parameter values can be compared with specified, desired values or desired value ranges, in order, in this way, to monitor, whether the field device is located in a specified, desired state. Moreover, by tracking the selected device parameters, changes and trends of the monitored parameters can be recognized early. Such changes can be brought about, for example, by process influences or by systematic errors. By monitoring the selected parameters, such changes are recognized early. This enables a predictive planning of corrective measures, such as, for example, cleaning or maintenance of the field device.

The data for a field device, which are registered within the field device via the different functions for self monitoring, can be written into a cloud for documentation of the device state. In such case, the data transferred to the cloud can include data for at least one of device state, device diagnosis and calibration, especially, for example, values of selected parameters and results of self-tests. Such a continued documentation of the device state is especially required in the case of safety-critical processes, such as, for example, in the manufacture of pharmaceuticals, food and drinks, in order that the error freedom of the measurement results can be documented for the different batches.

Figure 2:
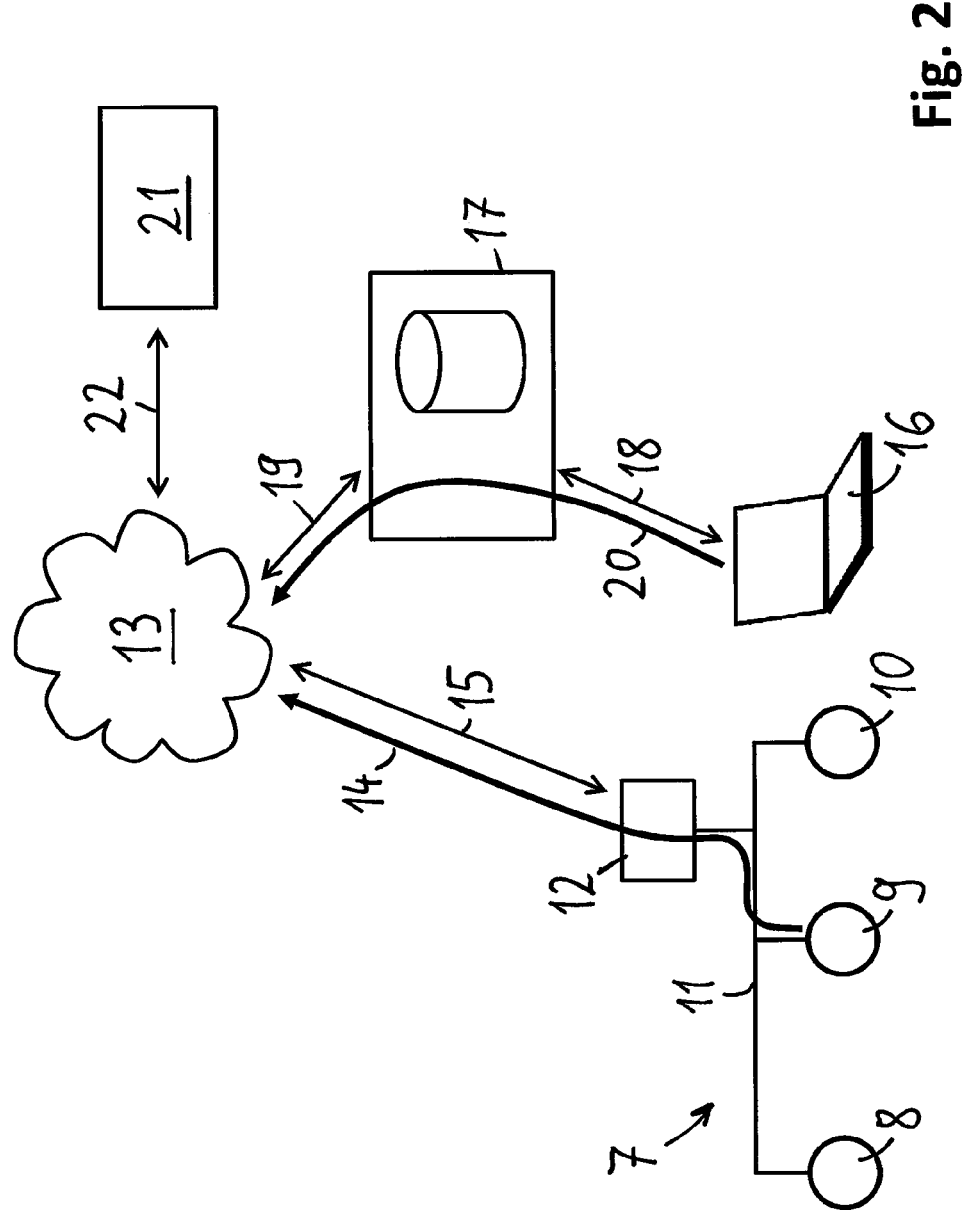
FIG. 2 shows the transmitting to a cloud of first data registered device-internally in a field device and second data registered by an external service computer.

FIG. 2 shows a fieldbus network 7 with a plurality of field devices 8, 9, 10, which are connected to a fieldbus 11. Connected to the fieldbus 11 is, moreover, an edge device 12, which is embodied to orchestrate the data transfer between the fieldbus network 7 and a cloud 13. It is assumed that at least one of the field devices 8, 9, 10 has a self-monitoring functionality and registers device-internally data for at least one of device state, device diagnosis and calibration. These device-internally registered, first data are then transferred to the cloud 13 from the relevant field device, for example, from the field device 9, via a first data transfer path 14. In such case, the first data transfer path 14 can extend from the field device 9 via the fieldbus 11 to the edge device 12 and from there via an Internet connection 15 further to the cloud 13. Alternatively, the data can be transferred from the field device 9 to the cloud 13 via a wireless connection. In such case, the device-internally registered, first data can be written into the cloud 13, for example, based on a specified time plan, preferably at regular intervals. In the cloud 13, there is for the field device 9 a record, which can be identified, for example, based on an identifier characteristic for the field device. Stored in this record in their time sequence are the device-internally registered, first data. The device-internally registered, first data comprise data for at least one of device state, device diagnosis and calibration. Stored in the record can be, for example, the values of selected device parameters. Moreover, stored in the record can be, for example, diagnostic data as well as NAMUR device states, which were registered at a certain point in time. Moreover, stored in the record in the cloud can be, for example, test results from device self-tests, which were performed at certain points in time. The test results of the self-test can, for example, also comprise calibration data and quantitative measured values for different components and functionalities of the field device 9.

In the context of operating the field devices 8, 9, 10, it is, moreover, provided, at least from time to time, preferably in certain time intervals, to perform an external calibration of a field device. This external calibration is, as a rule, performed by a service technician assigned to do such. Frequently, it is necessary for calibrating to deinstall the field device from its installed environment. By means of a calibrator, one or more exactly predeterminable values of the particular measured variable can be applied to the sensor of the field device. For calibrating a temperature measuring device, for example, the field device can be exposed to one or more different temperatures. For calibrating a field device for flow measurement, the flow can be set, for example, by means of a calibrator sequentially to different values. For each value of the measured variable presented the sensor, the measured value output by the field device is registered. The measured value or measured values can, for example, be input or read into an external service computer 16. The measured value output by the field device in the case of applying a defined value of the measured variable permits a conclusion, whether the field device is measuring correctly. Especially, it can be judged, whether the measured value delivered by the field device still lies within a maximum permissible error (MPE) or whether the measured value is outside of the allowed error range. Based on the registered measured values, the service technician can perform a new parametering of the field device. For this, the field device is so adjusted by the setting of suitable parameters that the field device delivers a correct measured value for each value of the measured variable provided by the calibrator.

In such case, the external service computer 16 registers one or more of the following data: maintenance data, device state, device diagnosis of a field device, data of performed measurements as well as calibration data for calibration of the field device. Stored in the external service computer 16 after the calibration is a data set of the calibration. In case a deinstallation of the field device was required for the calibration, the field device can after termination of the calibration be reinstalled in its original measuring environment.

In order to facilitate the performance of maintenance- and calibration tasks, a central data processing system 17 can be provided, in which, for example, data sets are stored for the application of the service technology. The second data registered by the external service computer 16 for at least one of maintenance, device state, device diagnosis and calibration of the serviced or calibrated field devices can be transferred via a data connection 18 to this central data processing system 17 and stored there. The data stored in the central data processing system 17 comprise, for example, the performed maintenance- and calibration services, a listing of the performed measures, technical data for the serviced or calibrated field devices, the duration of the service visit, the name of the service technician, etc. Stored in the central data processing system 17 can be, for example, both business data for the particular service jobs of the service technician as well as also technical data for at least one of maintenance, device state, device diagnosis and calibration of the serviced field devices. The data held in the central data processing system 17 serve for documentation of the performed measures and as basis for invoicing customers.

At least a part of the second data, which are registered by means of the external service computer 16 and stored in the central data processing system 17, is written via a data connection 19 into the cloud 13. For this, for example, that part of the data in the central data processing system 17, which concerns at least one of maintenance, device state, device diagnosis and calibration, is transferred into which cloud 13 according to a specified time schedule, preferably at regular intervals. At least a part of the second data registered by the external service computer 16 for at least one of maintenance, device state, device diagnosis and calibration is thus written into the cloud 13 via a second data transfer path 20. The second data transfer path 20 for transferring the second data extends from the external service computer 16 via the central data processing system 17 to the cloud 13. Alternatively, it would also be possible to write the second data registered by the external service computer 16 from the external service computer 16 via a wireless connection directly into the cloud 13. This transfer path for the second data is especially used when the system has no central data processing system 17 for the service data.

The device-internally registered, first data of the field devices are written into the cloud 13 via the first data transfer path 14, while, in contrast, the second data registered by the external service computer 16 are transferred to the cloud 13 via the second data transfer path 20. Within the cloud 13, the device-internally registered, first data are brought together with the second data registered by the external service computer 16. For example, both the first data as well as also the second data of a certain field device can be stored in the cloud 13 in a record provided for the field device. In such case, the record in the cloud 13 belonging to the field device can be identified, for example, based on an identifier characteristic for the particular field device. The device-internally registered, first data and the second data registered by the service computer 16 for a field device can then be brought together in the cloud 13 in the record for such field device based on the identifier of the field device.

Used as identifier of a field device can be, for example, manufacturer and serial number of the field device. Alternatively, for example, a UUID (Universal Unique Identifier) of a field device or a MAC address (Media Access Control address) of the network card of a field device or a unique identifier of the SIM card (Subscriber Identity Module) of a field device can be used as identifier. By combined storing of the device-internally registered, first data with the second data registered by the external service computer 16, a combined presentation and/or evaluation of these two types of data is enabled, which especially with reference to maintenance, device state, device diagnosis and calibration enables an improved total view of the device behavior. In this way, device documentation as well as traceability of device state and calibration are improved.

For presentation and evaluation of the registered data, an evaluation unit 21 can be provided, which accesses the data stored in the cloud 13 and presents and/or evaluates such data. The evaluation unit 21 can be provided in the cloud 13, or implemented in a third computer, which accesses the data stored in the cloud 13 via a data connection 22.

Preferably, the evaluation unit 21 is embodied to present the device-internally registered, first data for at least one of device state, device diagnosis and calibration together with the data registered by the external service computer 16 for at least one of maintenance, device state, device diagnosis and calibration. This presentation of the data can especially display the time sequence of the different registered device states, device diagnoses or calibrations. Suited for graphic display of the device state as a function of time are, for example, the graphic symbols of the NAMUR device states.

The evaluation unit 21 can preferably be provided to present results of the device-internally performed self-tests together with data ascertained in the context of external calibrations of the field device, wherein the different calibration data are preferably plotted as a function of time. In this way, an overview of the calibration data ascertained device-internally in the case of self-test and the calibration data ascertained in the case of an external calibration can be shown. In this way, the user can compare the internally and externally registered calibration data. The user can, for instance, detect that both calibration data agree, so that the trust of the customer in the device-internally performed self-test is strengthened. Using the time curve of the calibration data, moreover, a drift of the measured value delivered by a particular field device can be recognized. The presentation of the previous calibration events as a function of time gives the user an overview of the state of the calibration and enables, moreover, the planning of future internal self-tests and external calibrations. For this, it can also be provided that the evaluation unit 21 reminds the user of future self-tests and calibrations. Moreover, the evaluation unit 21 can be embodied automatically to perform a comparison between the device-internally registered calibration data, which are ascertained, for example, in the context of a self-test, and the external calibrations. In other words, the evaluation unit 21 can be embodied automatically to perform a statistical consistency testing between the device-internally registered calibration data and the calibration data registered by external calibrations.

Figure 3:
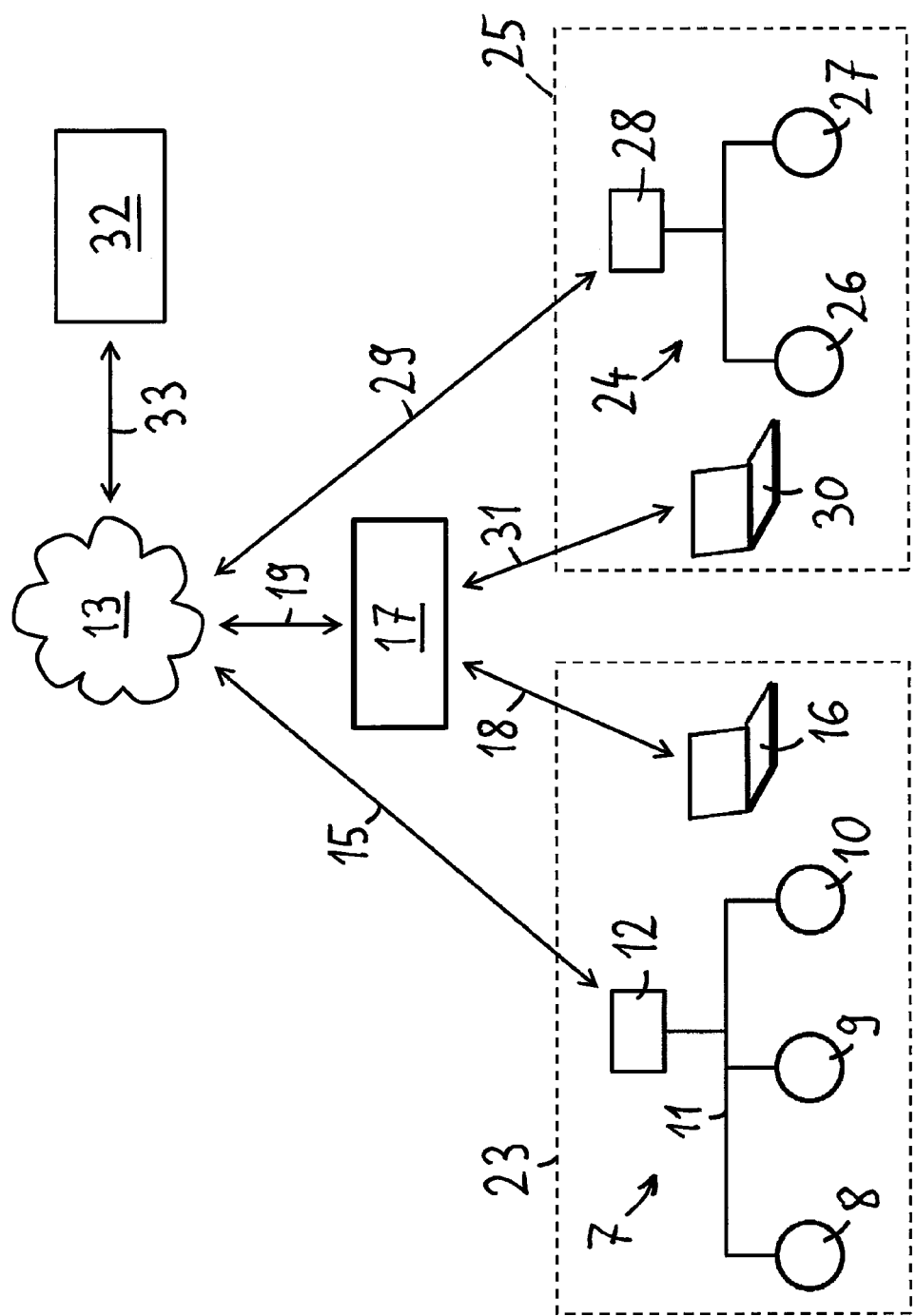
FIG. 3 shows a location wide bringing together in the cloud of first and second data of field devices in different fieldbus networks.

It is, moreover, possible, to bring together in the cloud 13 data for at least one of device state, device diagnosis and calibration of field devices at different places and/or in different fieldbus networks. Shown schematically in FIG. 3 is how both data from a first fieldbus network 7 at the location 23 as well as also data from a second fieldbus network 24 at the location 25 can be written into the cloud 13. The fieldbus network 7 has the field devices 8, 9, 10, which are connected to the fieldbus 11, as well as the edge device 12 connected to the fieldbus 11. First data for at least one of device state, device diagnosis and calibration, which are registered, for example, device-internally in the field device 9, are written into the cloud 13 via the first edge device 12 and the data connection 15. Moreover, second data for at least one of device state, device diagnosis and calibration of one of the field devices 8, 9, 10 can be registered by means of the external service computer 16 and transferred via the data connection 18 to a central data processing system 17, wherein at least one part of this data is written via the data connection 19 into the cloud 13.

Analogously within the second fieldbus network 24, first data registered device-internally in one of the field devices 26, 27 are written via the edge device 28 and a data connection 29 into the cloud 13. Moreover, second data registered by means of an external service computer 30 for one of the field devices 26, 27 of the second fieldbus network 24 can be transferred via a data connection 31 to central data processing system 17 and from there written, at least partially, via the data connection 19 into the cloud 13. In the cloud 13, thus first data and/or second data of field devices at different places and/or in different fieldbus networks can be brought together.

For evaluation of this data, an evaluation unit 32 is provided, which is connected with the cloud 13, for example, via a data connection 33. The evaluation unit 32 can download data of different field devices from the cloud 13, show such on a display and/or evaluate such. In such case, the evaluation unit 32 can be embodied to retrieve data from the cloud for those field devices, which correspond to filter criteria specifiable by the user. For example, the user can specify a field device type, a certain measuring principle or a certain installation environment or measurement application as filter criterion, wherein then only those data are transferred from the cloud 13 to the evaluation unit 32, which correspond to the specified filter criterion. This data for at least one of device state, device diagnosis and calibration can be shown and/or evaluated individually or together. For example, an option is to apply an averaging method to first and/or second data for selected field devices, which correspond to a specified filter criterion, in order, in this way, to produce averaged data, which reflect a typical device behavior of the selected field devices. This averaged device behavior can then be used as reference for all those field devices, which correspond to the specified selection criterion. Due to the extensive database, a typical device behavior can be ascertained location wide, for example, for a certain field device type, however, also for field devices using a certain measuring principle or serving in a certain measurement application or installation environment, which then is applicable as reference for such field devices.

The invention claimed is:

1. A method for storing data for at least one of device state, device diagnosis and calibration of a field device in a cloud, wherein the field device has a self- monitoring functionality, wherein the method comprises: device-internal registering of first data for at least one of device state, device diagnosis and calibration by the field device and transferring the device-internally registered, first data from the field device to the cloud, and registering of second data for at least one of device state, device diagnosis and calibration of the field device by using at least of an external service computer and transferring the second data from the external service computer to the cloud, wherein both the first data and the second data are stored in the cloud; wherein the field device is embodied to register data for at least one of device state and device diagnosis device-internally according to a specified time plan and to transfer to the cloud; wherein the external service computer is embodied in the context of a calibration to register calibration data of the field device, wherein the second data transferred to the cloud from the external service computer comprise at least a part of the registered calibration data of the field device; the external service computer is embodied to register calibration data of the field device as part of a calibration device or in cooperation with a calibration device; wherein the calibration device is embodied for performing the calibration to set a measured variable measured by the field device to a specified value or sequentially to a plurality of specified values, wherein the associated measured value delivered from the field device is registered by using the external service computer; wherein the external service computer is a laptop, a tablet or a mobile device of a service technician; the first data of the field device and the second data of the field device are brought together in the cloud in a record associated with the field device; the data transferred to the cloud are stored in records, each of which is associated with a certain field device, wherein a record in the cloud for a field device is identifiable based on an identifier characteristic for the field device; wherein the characteristic identifier is one of the following: manufacturer and serial number of the field device, a universally unique identifier (UUID) of the field device, a medium access control (MAC) address of a network card of the field device, a unique identifier of a subscriber identity module (SIM) card of the field device.

2. The method of claim 1, wherein the field device is embodied to perform a device self-test and to transfer results of the device self-test to the cloud.

3. The method of claim 1, wherein the field device is embodied to read out an earlier established set of device parameters device-internally according to a specified time plan and to transfer such to the cloud.

4. The method of claim 1, wherein at least one of the following:
   the field device is embodied upon instruction of the user to perform a device self-test and to transfer results of the device self-test to the cloud;
   the field device is embodied to perform a self-test and in the context of a self-test to check at least one of the following: a sensor of the field device, an evaluating electronics of the field device, at least one memory of the field device, an IO-system of the field device, at least one connection line of the field device, an output signal of the field device;
   the field device is embodied to associate registered data for at least one of device state and device diagnosis with one of a group of predefined device states;

the field device is embodied to associate registered data for at least one of device state and device diagnosis with one of a group of predefined device states, wherein the predefined device states involve device states of the standard, NAMUR NE 107; or the field device is embodied to read out an earlier established set of device parameters device-internally according to a specified time plan and to transfer such to the cloud, wherein the set of device parameters characterizes at least one of device state, device diagnosis and calibration of the field device.

5. The method of claim 1, wherein the device-internally registered first data are transferred via a first data transfer path into the cloud and the second data registered by the external service computer are transferred into the cloud via a second data transfer path different from the first data transfer path.

6. The method of claim 1, wherein at least one of the following:

the field device is part of a first fieldbus network and the device-internally registered, first data are transferred into the cloud via a first data transfer path, wherein the first data transfer path extends from the field device via the first fieldbus network to the cloud;

the field device is part of a first fieldbus network and the first fieldbus network includes an edge device, wherein the device-internally registered, first data are transferred via a first data transfer path into the cloud and wherein the first data transfer path extends from the field device via the first fieldbus network and the edge device to the cloud; or the device-internally registered, first data are transferred into the cloud via a first data transfer path and the second data registered by the external service computer are transferred into the cloud via a second data transfer path different from the first data transfer path, wherein the second data transfer path extends from the external service computer to a central data processing system and from there further to the cloud.

7. The method of claim 1, wherein at least one of the following:

the external service computer is embodied to transfer data via a data connection to a central data processing system;

the external service computer is embodied to transfer data via a data connection to a central data processing system, which is embodied to store data of service instances; or the external service computer is embodied to transfer data via a data connection to a central data processing system, wherein at least a part of the data stored in the central data processing system is transferred via another data connection into the cloud.

8. The method of claim 1, wherein at least one of the following:

the first data and the second data are brought together in the cloud;

the first data of the field device and the second data of the field device are brought together in the cloud in a record associated with the field device;

the data transferred to the cloud are stored in records, each of which is associated with a certain field device, wherein a record in the cloud for a field device is identifiable based on an identifier characteristic for the field device;

the data transferred to the cloud are stored in records, each of which is associated with a certain field device, wherein a record in the cloud for a field device is identifiable based on an identifier characteristic for the field device, wherein the characteristic identifier is one of the following: manufacturer and serial number of the field device, a universally unique identifier (UUID) of the field device, a medium access control (MAC) address of a network card of the field device, a unique identifier of a subscriber identity module (SIM) card of the field device.

9. The method of claim 1, wherein:

retrieving at least a part of the first data and at least a part of the second data of one or more field devices from the cloud by an evaluation unit, which is embodied to evaluate or to present the downloaded data.

10. The method as claimed in claim 1, wherein at least one of the following:

the evaluation unit is embodied to present first data and second data for a field device together on a display;

the evaluation unit is embodied to present first data and second data for at least one of device state and device diagnosis of a field device on a display as a function of registering point in time of the data;

the evaluation unit is embodied to present first data and second data for calibration of a field device on a display as a function of the registering point in time of the data;

the evaluation unit is embodied to present together results of at least one device self-test of a field device and second data registered by the external service computer for calibration of the field device;

the evaluation unit is embodied to perform a comparison between device-internally registered, first data of a field device and second data of the field device registered by the external service computer;

the evaluation unit is embodied to perform a comparison between device-internally registered, first data for calibration of a field device and second data for calibration of the field device registered by the external service computer;

the evaluation unit is embodied to perform consistency testing between device-internally registered, first data for calibration of a field device and second data for calibration of the field device registered by the external service computer; or the evaluation unit is embodied to evaluate first and second data for calibration of a field device as a function of the registering point in time of the data and to ascertain a drift of a measured value of the field device.

11. The method of claim 1, wherein the field device is part of a first fieldbus network, wherein the method comprises additional steps as follows:

device-internal registering of additional first data for at least one of device state, device diagnosis and calibration by a second field device, which is connected to a second fieldbus network, wherein the second fieldbus network is different from the first fieldbus network, and transferring the device-internally registered additional first data from the second field device into the cloud.

12. The method of claim 1, wherein the field device is part of a first fieldbus network, wherein the method comprises additional steps as follows:

registering additional second data for at least one of device state, device diagnosis and calibration of a second field device, which is connected to a second fieldbus network, using the external service computer or using an additional external service computer and transferring the additional second data from the external service computer into the cloud.

13. The method of claim 11, wherein the first fieldbus network is located at a first location and that the second fieldbus network is located at a second location different from the first location.

14. The method of claim 8, wherein at least one of the following:
- first and second data from a plurality of field devices are stored in the cloud, which field devices are located at different places or in different fieldbus networks;
- the evaluation unit is embodied to retrieve from the cloud and to evaluate or to present on a display at least a part of the first data and at least a part of the second data of a plurality of field devices;
- the evaluation unit is embodied to retrieve from the cloud and to evaluate or to present on a display at least a part of the first data and at least a part of the second data of a plurality of field devices, which are located at different places or in different fieldbus networks;
- the evaluation unit is embodied to select field devices, for which first data or second data are stored in the cloud, according to at least one predeterminable selection criterion, to retrieve data of the selected field devices from the cloud and to evaluate or to present such together;
- the evaluation unit is embodied to select field devices, for which first data or second data are stored in the cloud, according to at least one predeterminable selection criterion, to retrieve data of the selected field devices from the cloud and to evaluate or to present such together, wherein the at least one predeterminable selection criterion is at least one of device type, measuring principle, use conditions of the field device; or
- the evaluation unit is embodied to select field devices, for which first data or second data are stored in the cloud, according to at least one predeterminable selection criterion, to retrieve data of the selected field devices from the cloud and based on the downloaded data to determine an averaged device behavior, which is applicable as performance reference for field devices of the particular type.

15. The method of claim 8, wherein one of the following:
the evaluation unit is embodied as an evaluation unit executable in the cloud; or the evaluation unit is embodied as an evaluation unit executable in a third computer and embodied from the third computer to retrieve data from the cloud.

16. A fieldbus system, including: a field device which has a self-monitoring functionality and is embodied to register device-internally first data for at least one of device state, device diagnosis and calibration of the field device, a cloud, wherein the device-internally registered, first data are transferable from the field device to the cloud, wherein second data for at least one of device state, device diagnosis and calibration of the field device are registrable by means of an external service computer and transferable to the cloud, and wherein the data stored in the cloud comprise both the device-internally registered, first data and also second data registered by the external service computer; wherein the field device is embodied to register data for at least one of device state and device diagnosis device-internally according to a specified time plan and to transfer to the cloud; wherein the external service computer is embodied in the context of a calibration to register calibration data of the field device, wherein the second data transferred to the cloud from the external service computer comprise at least a part of the registered calibration data of the field device; the external service computer is embodied to register calibration data of the field device as part of a calibration device or in cooperation with a calibration device; wherein the calibration device is embodied for performing the calibration to set a measured variable measured by the field device to a specified value or sequentially to a plurality of specified values, wherein the associated measured value delivered from the field device is registered by using the external service computer; wherein the external service computer is a laptop, a tablet or a mobile device of a service technician; the first data of the field device and the second data of the field device are brought together in the cloud in a record associated with the field device; and the data transferred to the cloud are stored in records, each of which is associated with a certain field device, wherein a record in the cloud for a field device is identifiable based on an identifier characteristic for the field device, wherein the characteristic identifier is one of the following: manufacturer and serial number of the field device, a universally unique identifier (UUID) of the field device, a medium access control (MAC) address of a network card of the field device, a unique identifier of a subscriber identity module (SIM) card of the field device.

17. The fieldbus system of claim 16, wherein there are provided in the cloud records, each being for a different field device, wherein the first and second data of a field device transferred to the cloud can be brought together in a record for the field device.

* * * * *